United States Patent Office 2,812,353
Patented Nov. 5, 1957

2,812,353

6-PHENYL-5-HEPTEN-2-ONE

Walter Kimel, Highland Park, N. J., assignor to Hoffmann-La Roche Inc., Nutley, N. J., a corporation of New Jersey No Drawing. Application August 19, 1955,
Serial No. 529,565

1 Claim. (Cl. 260—590)

This invention relates to novel chemical compounds and to novel processes useful in their preparation. An important aspect of the invention relates to the novel compounds 6-phenyl-5-hepten-2-one. The latter possesses a characteristic pleasant fragrance, and is useful, for example, as an odor-imparting agent in the compounding of perfumes, flavors and other scented preparations in which it is desired to impart this fragrance as a component of the scent.

In one comprehensive embodiment, the invention provides a process for the preparation of 6-phenyl-5-hepten-2-one which comprises condensing 2-phenyl-3-buten-2-ol with diketene and heating the condensation product to eliminate carbon dioxide therefrom.

The invention is further disclosed in the following example, which is illustrative but not limitative thereof:

*Example*

To a solution of 365 g. (2.46 mols) of 2-phenyl-3-buten-2-ol in 365 cc. of petroleum ether was added 5 cc. of pyridine and 5 cc. of acetic acid. The mixture was stirred vigorously, and 227.5 g. (2.81 mols) of diketene was added, dropwise, during two hours, while maintaining a reaction temperature of 25–30° C. The reaction was allowed to continue for 6 hours at that temperature.

Finally, the mixture was washed in a separatory funnel twice with 100 cc. of 15% aqueous sulfuric acid, 4 times with 100 cc. portions of saturated aqueous sodium bicarbonate, and then with water until neutral. The solution was dried over anhydrous calcium sulfate, and the solvent was removed in vacuo, leaving 2-phenyl-3-buten-2-yl acetoacetate in quantitative yield; $n_D^{25}=1.5120$.

The ester was heated to 110–125° C., whereby a vigorous evolution of carbon dioxide occurred. When the initial vigorous reaction had subsided somewhat, heating was continued at 130–140° C. until evolution of gas had ceased—a total of about 2½ hours.

The crude product was taken up in an equal volume of diethyl ether, and washed several times with saturated aqueous sodium bicarbonate solution, and finally with water. The solution was dried over anhydrous calcium sulfate, and the product, 6-phenyl-5-hepten-2-one, was isolated by vacuum fractional distillation; B. P. 98–99° C./0.4 mm.; $n_D^{25}=1.5389$; $d_{25}=0.9898$. This compound possesses a pleasant, fresh odor reminiscent of wild strawberries, and evidences its characteristic fragrance at high concentrations, as also in high dilutions. It has excellent power of adherence. Because of its unusual olfactory, physical and chemical characteristics, it can be used to advantage in perfumes and cosmetic items such as lipsticks; and in flavoring essences, cordials, liqueurs, and the like.

I claim:
6-phenyl-5-hepten-2-one.

OTHER REFERENCES

Kimel et al.: J. Am. Chem. Soc. 65 (1943), pp. 1992–1998.